United States Patent Office 3,314,889
Patented Apr. 18, 1967

3,314,889
MULTIPURPOSE GREASE COMPOSITION
John B. Christian, Yellow Springs, Ohio, assignor to the United States of America as represented by the Secretary of the Air Force
No Drawing. Filed Mar. 27, 1964, Ser. No. 355,511
6 Claims. (Cl. 252—49.6)

The invention described herein may be manufactured and used by or for the Government of the United States of America for governmental purposes without the payment of any royalties thereon or therefor.

This invention relates to a new composition of matter suitable for use as a multipurpose grease. More particularly this invention relates to a multipurpose grease which is operational under heavy-load and high-speed conditions over a broad temperature range.

Recent advancements in the technology of high-speed engines such as those used in supersonic aircraft and the attendant encounters with high temperatures resulting from the higher speeds of operation and the new environments into which the vehicles are traveling have long demonstrated the inadequacies of petroleum-based lubricating fluids and greases. As this has come about, various synthetic lubricating compositions have been developed and utilized to meet specific lubricating needs. Organosilicon or siloxane lubricating fluids for example are well known for their ability to withstand extreme temperature conditions. To meet other specific demands, the organosilicon fluids have been modified by admixtures therewith of such components as halogenated fatty acids, low molecular weight polymers of perfluorochloroolefins and the like. Of late, particular emphasis has been placed upon the incorporation with the organosilicon base fluid of various halogen-containing compounds to improve high-temperature properties; but it is noteworthy that the use of these compounds has been directed solely toward the modification of the properties of the fluid itself, considered either as an oil or as a fluid base for a grease.

The lubricating fluids thus considered are to be distinguished from greases which have a shear strength at least greater than that normally associated with liquids and, unlike even the most viscous fluids, are capable of preserving their dimensional and positional stability. From a lubrication standpoint, such a material is of course often desirable in that it can provide continuous lubrication at a point at which a liquid fluid could be neither confined nor continuously supplied. To provide this "grease-like" consistency, the prior art has long combined a variety of organic "fillers" or "thickeners" with the various lubricating base fluids, from the earlier petroleum-based fluids on down through the organosiloxanes above-mentioned. It has become increasingly apparent, however, that while rather substantial improvements in the desired properties of the lubricating fluids have been achieved, comparable advancements have not been attained in compositions suitable for use as greases. Indeed, as the art has sought to utilize the improved base fluids in greases for lubricating applications such as in high-speed engines of aircraft or space vehicles where inertial and gravitational influences require a grease operational over a broad temperature range under high-load and high-speed conditions, it has been frustrated in that a grease could not be found which would not prematurely become highly fugitive and lost.

By way of specific example, while the modification of various synthetic lubricating fluids with fluorine-containing compounds has been practiced in the prior art to achieve high-temperature properties, it has been an unfortunate related circumstances that the fluids thus modified have been subject to a rapid decrease in their viscosity as their temperature is elevated. While the prior art attempts to reverse this tendency, including certain efforts to modify the base fluid by the addition of small amounts of halogen-containing materials, have met with some degree of success, the direction of the research and development prior to the teachings of this invention has been primarily toward the modification of the fluid itself and has not considered utilizing the various halogen-containing organic materials as fillers or thickeners to achieve a grease-like consistency or in quantities which would render them operable as such. Conceivably, the art has been led away from the use of organic grease thickeners in general and halogen-containing organic materials in particular because of the known tendency of such materials to promote a decrease in viscosity as temperature rises. The art was perhaps further dissuaded from use of fluorine-containing or other organic fillers in quantities sufficient to thicken the mixture for the reason that, as the grease was subjected to high-speed operation under load conditions, such fillers would tend to separate from the base fluid and "ball up" thereupon either being thrown from the mechanisim to be lubricated or building up to interfere with the free movement of the parts. In either event, the separation of the filler from the fluid destroyed the grease-like consistency, and lubrication was no longer available at the points desired.

The deficiencies of the known greases are particularly apparent and limiting when they are used to provide lubrication for heavily loaded ball bearings operating at rotational speeds of from 10,000 to 20,000 revolutions per minute. While some greases have been developed which will preserve their position and dimensional stability at such speeds and under such loadings, they have not possessed sufficient temperature range to withstand the heat generated by the high speeds or the broad temperature range encountered in space travel for example. Moreover, attempts to modify grease compositions to meet the necessary speed, temperature and load requirements have been further complicated by other limiting requirements such as resistance to degradation upon exposure to various petroleum-type fuels and to high-oxidation potential environments.

It is accordingly an object of this invention to provide an improved multipurpose grease composition.

Yet another object of the invention is to provide such a composition which will be operational over a broad temperature range and will preserve its stability and grease-like characteristics even when the lubricated parts are operating at high speeds and under heavy loads.

Still another object of the present invention is to provide such a grease composition which will exhibit good resistance to petroleum-based fuels and oils and will resist oxidation or explosion in the presence of high-oxidation environments such as that associated with the presence of liquid oxygen.

A more specific object of the present invention is to provide a grease composition wherein the thickener thereof will not separate prematurely from the lubricating base fluid.

To achieve these and other objects and advantages which will be apparent from a reading of the following disclosure the present invention teaches the combination of a high-temperature organosilicon lubricating base fluid with a novel high-temperature polymeric thickener in a particular range of proportions. The specific base fluid employed pursuant to this invention is a fluorosilicone fluid such as that known as Dow Corning FS 1265 manufactured and distributed under that designation by Dow Corning Corporation, Midland, Mich. The specific fluorosilicone fluid manufactured and sold under the FS 1265 designation is of a viscosity grade of from 250 to 1,000 centistokes at the lower limit and up to 10,000 centistokes at the upper limit, a specific gravity within the range of from 1.24 to 1.30, a freezing point of from −60 degrees Fahrenheit to −25 degrees Fahrenheit, a flash point of from 440 degrees Fahrenheit to 530 degrees Fahrenheit, and a trace of acidity. More specifically FS 1265 can be designated as a polymeric trifluoropropylmethylsiloxane of the composition and structure

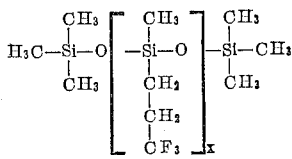

is listed on page 1 of Preprint No. 63LC–12, "Boundary Lubricating Properties of Fluoroalkyl Silicones in Bench and Pump Tests" by H. M. Schiefer and J. Van Dyke, published by American Society of Lubrication Engineers, Chicago, Illinois, 1963.

The organic or polymeric thickener to be employed in combination with the fluorosilicone base fluid according to the teachings of this invention is a fluoroethylene polymer in the form of a powder, particularly that with a particle size such that it will pass through from a 100 to a 200 mesh screen. The fluoroethylene polymers thus involved are of the class consisting of tetrafluoroethylene and chlorotrifluoroethylene and are of the type often designated by the trademark "Teflon" which is the property of E. I. du Pont de Nemours & Company of Wilmington, Del. The fluoroethylene powders of the sizes indicated are admixed with the fluorosilicone base fluid by conventional mixing devices and techniques in the weight ratios of from 30 to 35 parts of the fluoroethylene powder to from 65 to 70 parts of the fluorosilicone base fluid, as a result of which the total grease will be from 30 to 35 percent fluoroethylene powder by weight and from 65 to 70 percent fluorosilicone base fluid by weight.

The improvements in a multipurpose grease compound according to this invention which render it particularly adaptable for use in a wide variety of applications, particularly involving high-speeds, high-temperatures, and high-loads such as are encountered in high-speed aircraft, rocket-powered space vehicles and the like, are demonstrated by the following specific examples and relevant test data. These examples also illustrate the criticality of the preferred ratio of the fluoroethylene powder to the silicone base fluid.

EXAMPLE I 30 parts by weight of a polytetrafluoroethylene powder of a size which would pass through a 200 mesh screen were thoroughly admixed with 70 parts by weight of the above-described Dow Corning FS 1265 fluorosilicone base fluid by first stirring in a conventional internal mixer and then blending by three passes through a 3-roll paint mill with the roller opening set at .002 inch, all at room temperature. Penetration of this grease, measured by means of the standard A.S.T.M. method, was from 293 to 297; and, on the Pope spindle bearing test under five pound load, the following results were achieved:

| | Hours |
|---|---|
| 10,000 r.p.m. at 450 degrees Fahrenheit | 1,000 |
| 10,000 r.p.m. at 500 degrees Fahrenheit | 221 |
| 20,000 r.p.m. at 400 degrees Fahrenheit | 1,000 |

EXAMPLE II 20 parts by weight of polytetrafluoroethylene powder of the 200 mesh screen size and 80 parts by weight of the Dow Corning FS 1265 fluid were admixed as above, and the resulting compound showed an A.S.T.M. penetration of from 350 to 364. On the Pope spindle bearing test under the same five pounds loading, the following results were achieved:

| | Hours |
|---|---|
| 10,000 r.p.m. at 450 degrees Fahrenheit | 300 |
| 10,000 r.p.m. at 500 degrees Fahrenheit | 120 |
| 20,000 r.p.m. at 400 degrees Fahrenheit | 225 |

EXAMPLE III 40 parts by weight of the polytetrafluoroethylene powder of a 200 mesh screen size and 60 parts by weight of the Dow Corning FS 1265 fluorosilicone fluid were admixed as set forth in Example I. The A.S.T.M. penetration of this composition was 227 to 232 and the Pope spindle bearing test under five pound loading gave the following results:

| | Hours |
|---|---|
| 10,000 r.p.m. at 450 degrees Fahrenheit | 214 |
| 10,000 r.p.m. at 500 degrees Fahrenheit | 100 |
| 20,000 r.p.m. at 400 degrees Fahrenheit | 140 |

As a standard of comparison for the above, one of the more advanced high-temperature greases available today is that conforming to the published military specification known as MIL–G–27343 which is designated as a "grease, ball and roller bearing for temperatures from minus 100 degrees Fahrenheit to plus 400 degrees Fahrenheit." The greases meeting this specification are generally of the class consisting of arylurea-thickened silicone type fluids. The requirements of greases according to this specification are that on the Pope spindle test under five pound load, the grease should be operative for 500 hours at 400 degrees Fahrenheit at 10,000 r.p.m.

A comparison of the above will disclose that the fluoroethylene powder in the approximate weight ratio of 30 parts to 70 parts of the base fluid provides an operational life considerably greater than that which could be expected from greases containing substantially different proportions of this particular thickener and of course greater than has been expected from the prior art greases.

While this invention has been described in considerable detail in connection with certain preferred embodiments and specific examples thereof, it is to be understood that this particularization has been for the purposes of illustration only and does not limit the scope of the invention as it is defined in the subjoined claims.

I claim:

1. A multipurpose high-speed, heavy-load grease compound operable over a broad temperature range comprising 65 to 70 parts by weight of a fluorosilicone base fluid of the structure

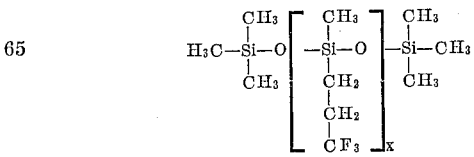

and 35 to 30 parts by weight of a powdered fluoroethylene polymer as a filler.

2. The grease compound of claim 1 wherein the base fluid is characterized by a viscosity grade of from 250 to 1000 centistokes at the lower limit and up to 10,000 centistokes at the upper limit, a specific gravity within the range of from 1.24 to 1.30, a freezing point of from −60 degrees Fahrenheit to −25 degrees Fahrenheit, a flash point of from 440 degrees Fahrenheit to 530 degrees Fahrenheit, and a trace of acidity.

3. The composition of claim 2 in which the filler is powdered polymeric tetrafluoroethylene.

4. The composition of claim 2 in which the filler is powdered polymeric chlorotrifluoroethylene.

5. A grease according to claim 2 wherein said powder is of a particle size which will pass through from a 100 mesh to a 200 mesh screen.

6. The composition of claim 5 wherein 70 parts by weight of fluorosilicone base fluid and 30 parts by weight of polytetrafluoroethylene powder are employed.

References Cited by the Examiner
UNITED STATES PATENTS 2,716,129  8/1955  Wilcock et al. _____ 252—49.6 X

OTHER REFERENCES

Advances in Petroleum Chemistry and Refining, by Kobe et al., vol. 9, Interscience Pub., New York, N.Y., 1964, page 105.

Synthetic Lubricants, by Gunderson et al., Reinhold Pub. Corp., New York, N.Y., 1962, pages 259 and 317.

DANIEL E. WYMAN, *Primary Examiner.*

I. VAUGHN, *Assistant Examiner.*